(12) United States Patent
Ahti et al.

(10) Patent No.: US 7,021,994 B2
(45) Date of Patent: Apr. 4, 2006

(54) METHOD AND APPARATUS FOR METALWORKING USING A COOLANT FLUID

(75) Inventors: Robert Allan Ahti, Hillsborough, NH (US); Larisa Alexandra Elman, Swampscott, MA (US); Norman Stanton Baylis, Salem, NH (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 10/605,909

(22) Filed: Nov. 5, 2003

(65) Prior Publication Data

US 2005/0095962 A1    May 5, 2005

(51) Int. Cl.
*B24B 1/00*      (2006.01)
*B24C 5/04*      (2006.01)

(52) U.S. Cl. .................. 451/53; 451/102; 451/449; 39/73; 39/289

(58) Field of Classification Search .............. 451/28, 451/53, 102, 177, 449, 450, 41; 239/1, 73, 239/289
See application file for complete search history.

(56) References Cited

U.S. PATENT DOCUMENTS

| | | | |
|---|---|---|---|
| 675,840 A * | 6/1901 | Phillips | 451/102 |
| 2,071,472 A * | 2/1937 | Clarence | 451/102 |
| 3,670,606 A | 6/1972 | Blomgren, Sr. et al. | |
| 3,713,746 A | 1/1973 | Luthy | |
| 4,444,495 A * | 4/1984 | Bramwell et al. | 356/138 |
| 4,512,115 A | 4/1985 | Miller | |
| 4,566,226 A | 1/1986 | Kimura | |
| 4,585,379 A | 4/1986 | Nagayama et al. | |
| 4,822,218 A | 4/1989 | Satoh | |
| 4,978,246 A | 12/1990 | Quenzi et al. | |
| 5,598,972 A * | 2/1997 | Klein et al. | 239/289 |
| 5,759,031 A * | 6/1998 | Goldsmith et al. | 433/29 |
| 5,773,791 A * | 6/1998 | Kuykendal | 219/121.84 |
| 6,107,110 A * | 8/2000 | Glogovsky | 438/16 |
| 6,123,606 A | 9/2000 | Hill et al. | |
| 6,257,811 B1 | 7/2001 | Schweizer et al. | |
| 6,374,158 B1 * | 4/2002 | Fusaro, Jr. | 700/254 |
| 6,386,948 B1 * | 5/2002 | Kondo | 451/28 |
| 6,454,636 B1 | 9/2002 | Iwabuchi | |
| 6,669,118 B1 * | 12/2003 | Webster | 239/548 |
| 6,902,469 B1 * | 6/2005 | Kondo et al. | 451/44 |
| 2003/0094515 A1 | 5/2003 | Webster | |
| 2004/0134968 A1 | 7/2004 | Opper | |

FOREIGN PATENT DOCUMENTS

| | | |
|---|---|---|
| JP | 61241065 A | 10/1986 |
| JP | 07132444 | 5/1995 |

* cited by examiner

*Primary Examiner*—Hadi Shakeri
(74) *Attorney, Agent, or Firm*—Daniel F. Nesbitt; Hasse & Nesbitt LLC

(57) ABSTRACT

A metal machining apparatus for removal of metal from a workpiece, that employs a laser-targeted coolant nozzle to apply coolant fluid to a machining tool, such as a grinding wheel, to remove metal from a workpiece. The laser-targeted coolant nozzle has a coolant nozzle body having a flow passage for the coolant fluid, and a laser bore through which a visible laser can be inserted. The visible laser cooperates with a positioning feature on the nozzle body for visually positioning the coolant nozzle relative to the grinding wheel. When the laser is removed and replaced with a seal plug, the stream of cooling fluid passing through the flow passage can be directed accurately at the grinding wheel for improved workpiece grinding.

6 Claims, 5 Drawing Sheets

METHOD AND APPARATUS FOR METALWORKING USING A COOLANT FLUID

BACKGROUND OF INVENTION

The invention concerns a method and apparatus for grinding that employs a coolant fluid. In particular, it relates to an enhancement to a process called creep-feed grinding by means of which a very high stock removal rate is achieved.

Creep-feed grinding is a full depth or full cut operation that often allows a complete profile depth to be cut from a solid in a single pass. The workpiece to be machined is fixed to a surface table which is fed passed the rotating grinding wheel at a constant speed. The stock removal rate is set by the size and number of chip cavities in the surface of the wheel in combination with a number of other factors. A high removal rate can be achieved, but the process can generate sufficient frictional heat to burn the workpiece surface and damage the wheel. Increasing the depth of wheel cut hitherto had required reduced workpiece feed rate or performing the operation in two or more passes.

Improvements have been found by providing adequate coolant flow to the wheel contact region ensuring workpiece cooling and grinding wheel cooling and efficient cleaning. It is well known to use jet cleaning nozzles delivering coolant close to the wheel surface in large volumes. The type and composition of the wheel is carefully chosen for the type of material to be ground for the most acceptable balance between stock removal rate and wheel wear.

Removal of metal material from a workpiece at higher rates can require a significant quantity of coolant that must be delivered precisely and in sufficient quantities at, and across the entire profile of, the interface between the metal working tool and the workpiece. Typically, the coolant nozzle is postioned manually by an operator based on experience and an estimate of an orientation and position that will deliver the coolant stream at the metalworking tool. The significant volume and pressure of the stream of coolant during a grinding operation, for example, floods the grinding compartment and obscures any view of the exact position of the coolant stream's impact and of the machining interface. Often, if the coolant stream has not been precisely delivered to the machining interface, the machined workpiece will have flaws due to excessive heat buildup or material removal, and must be reworked or scrapped.

Therefore, further improvements are needed to ensure that an adequate stream of coolant is delivered precisely and in sufficient quantities across the profile of the machining interface between the metalworking tool and the workpiece.

SUMMARY OF INVENTION

The present invention relates to a metal machining apparatus for removal of metal from a workpiece, comprising: 1) a holder for a workpiece, 2) a metalworking tool that is configured to engage the workpiece along a machining interface to remove metal from the workpiece, 3) a coolant nozzle for emitting a stream of a cooling fluid, the nozzle comprising a nozzle body having a flow passage and a laser bore, wherein the flow passage has an inlet and an outlet, and the laser bore has a line of sight with the flow passage outlet, and 4) a visible laser removably inserted into the laser bore, that cooperates with the nozzle body for visually positioning the nozzle relative to the metalworking tool, whereby the emitted stream of cooling fluid can be directed at the machining interface.

The invention also relates to a metal grinding apparatus for removal of metal from a workpiece, comprising: 1) a holder for a workpiece, 2) a rotating grinding tool that is configured to engage the workpiece at a machining interface to remove metal from the workpiece, wherein the machining interface has an interface profile, 3) a coolant nozzle for emitting a stream of a cooling fluid, wherein the stream has a cross-sectional profile substantially the same as the interface profile, and 4) a visible laser cooperating with the coolant nozzle, for visually positioning the nozzle relative to the metalworking tool, whereby the stream of cooling fluid can be directed at the machining interface, and wherein the cross-sectional profile of the stream registers with the interface profile of the machining interface.

The invention further relates to a laser-targeted coolant nozzle for use in applying coolant fluid to a machining apparatus for removal of metal from a workpiece at a machining interface, comprising: 1) a coolant nozzle body having a flow passage and a laser bore, wherein the flow passage has an inlet and an outlet, and the laser bore forms an access opening in the outer surface of the nozzle body and has a line of sight with the flow passage outlet, and 2) a visible laser removably insertable into the laser bore, that cooperates with the nozzle body for visually positioning the coolant nozzle relative to the machining apparatus, whereby the stream of cooling fluid can be directed at the machining interface.

The invention also relates to a method of using a visible laser to align a coolant stream emitted from a coolant nozzle toward the machining interface of a metal grinding tool when machining a work piece, comprising the steps of: 1) providing a metal working apparatus having a table and a metal grinding tool, and a work piece secured on the table, 2) providing a coolant nozzle for directing a stream of coolant fluid at a machining interface on the metal grinding tool, the coolant nozzle having a fluid outlet having a stream reference point, 3) providing a visible laser for emitting a visible laser beam, 4) associating the visible laser with the coolant nozzle, whereby the emitted laser beam passes through the stream reference point and indicates the destination of a stream of coolant fluid from the fluid outlet, 5) positioning the coolant nozzle with the associated visible laser, whereby the visible laser beam is directed at a machining reference point, 6) securing the coolant nozzle from movement, 7) passing coolant fluid through the coolant nozzle, whereby the stream of coolant fluid impinges the machining interface of the metal grinding tool, and 8) machining the work piece.

The invention further relates to use of a visible laser for targeting the orientation of a coolant nozzle, thereby directing a stream of coolant fluid at a machining interface of a machining tool with a workpiece during the removal of metal from a workpiece by the machining tool.

DETAILED DESCRIPTION

A variety of metalworking tools can be used to remove material from a work piece. A typical metalworking tool for removing material is a grinder, more specifically a grinding wheel. The grinding wheel is used to remove material from a work piece based upon the profile of the outer periphery of the wheel. A typical grinding wheel can have a flat profile or the profile can be curvilinear, rectilinear or a combination of both. Typically the profile of a cross section of the grinding wheel throughout its entire periphery is identical. The range of values of surface speed for the type of grinding wheel employed within which enhancement was achieved was from about 10 meters per second up to about 80 meters per second.

Figure 1:
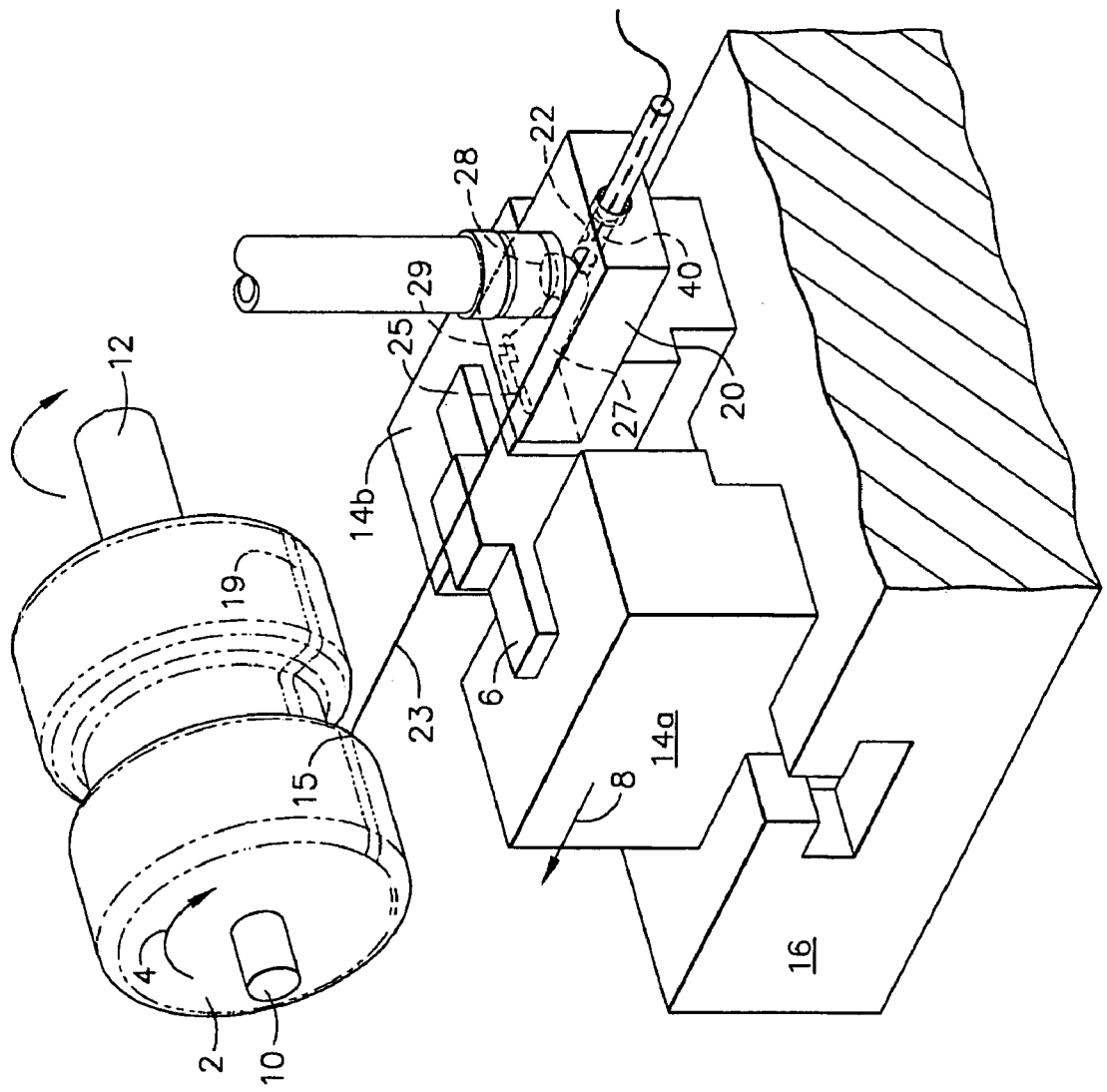
FIG. 1 shows a schematic diagram of a metalworking apparatus of the present invention, illustrated as a grinding wheel for removing metal from a workpiece, having a laser-targeted coolant nozzle with a visible light laser positioned therein.
Figure 2:
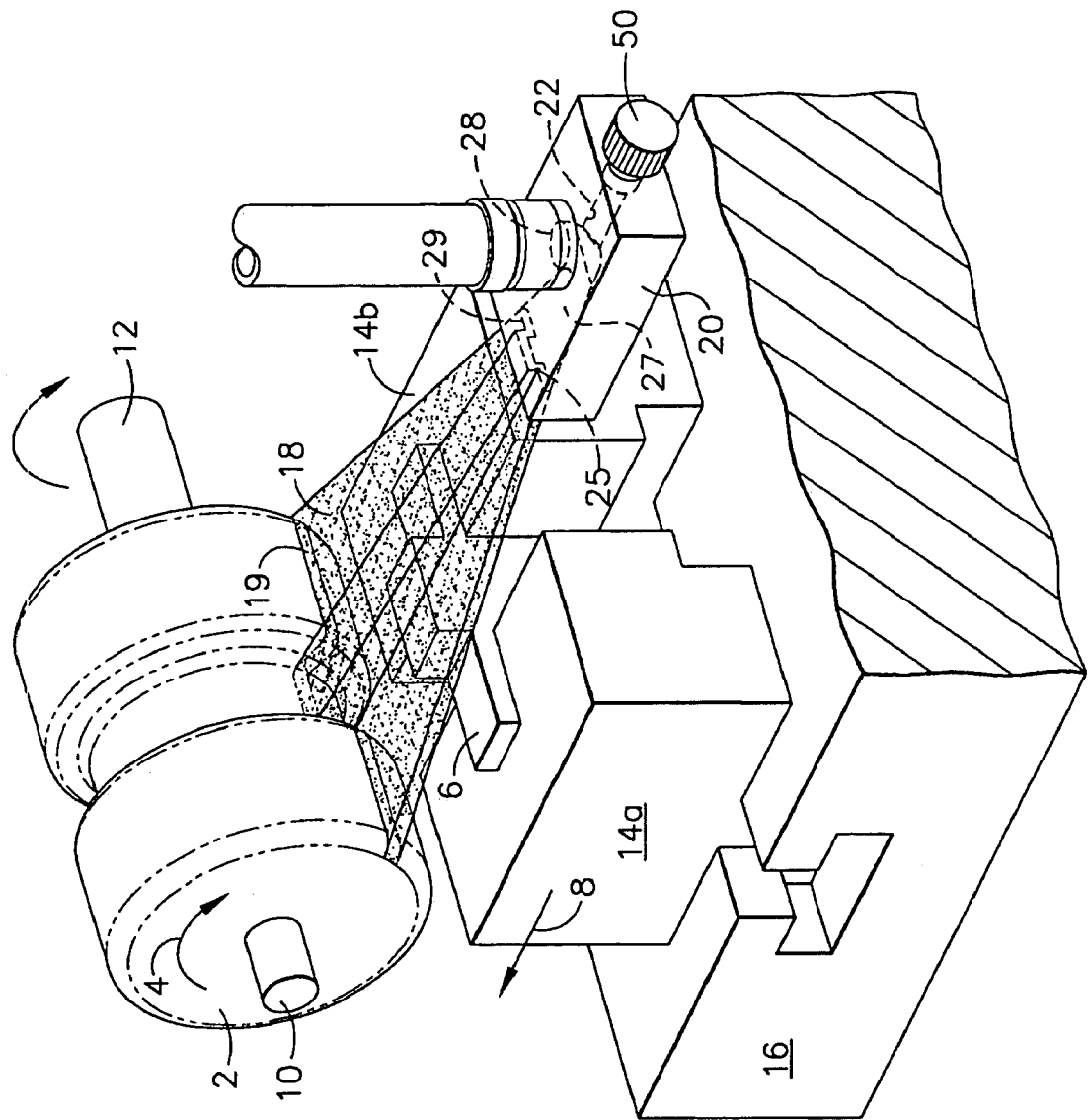
FIG. 2 shows the schematic diagram of FIG. 1, showing the coolant nozzle emitting a stream of coolant fluid.

FIGS. 1 and 2 show a metalworking assembly that includes a metalworking tool shown as a grinding wheel 2 rotating in the direction of arrow 4 to engage a workpiece 6 that can be moved into the rotating wheel 2 in the relative direction of arrow 8. The illustrated operation is known in the art as "down" grinding in a contact region of the grinding wheel. The invention is found to work just as well with "up" grinding. Essentially the process of the invention is a developed form of the process known as creep-feed grinding, although this may be regarded as something of a misnomer since the enhancement results in very much faster removal of workpiece material.

The grinding wheel 2 is mounted on a rotary spindle 10 carried by a tool head or chuck 12 which is part of a standard multi-axis machine. The workpiece 6 is secured in position for machining by means of a mounting fixture 14, illustrated as a pair of mounting brackets 14a and 14b, on a surface of a machining table 16. Since the invention is intended to be a "one-pass" grinding process, the width of the grinding wheel is configured to correspond to the width of the ground surface required. The workpiece is moved into and is machined by the rotating grinding wheel at a machining interface 19.

A typical grinding operation includes the grinding of the distal tips of a turbine blade used in a gas turbine engine.

During the grinding operation, as shown in FIG. 2, a stream 18 of liquid coolant, typically comprising a water-soluble oil, is emitted from and directed by nozzle 20 at the machining interface 19 on the periphery of wheel 2. The nozzle 20 is the outlet of a closed-loop coolant delivery, collection and filtration system. Spent coolant ejected from the wheel is collected in a sump (not shown), in the lower part of the machine, and drawn-off through an efficient filtration system to remove debris down to a particle size, typically of at least, about 10 micron.

Figure 3:
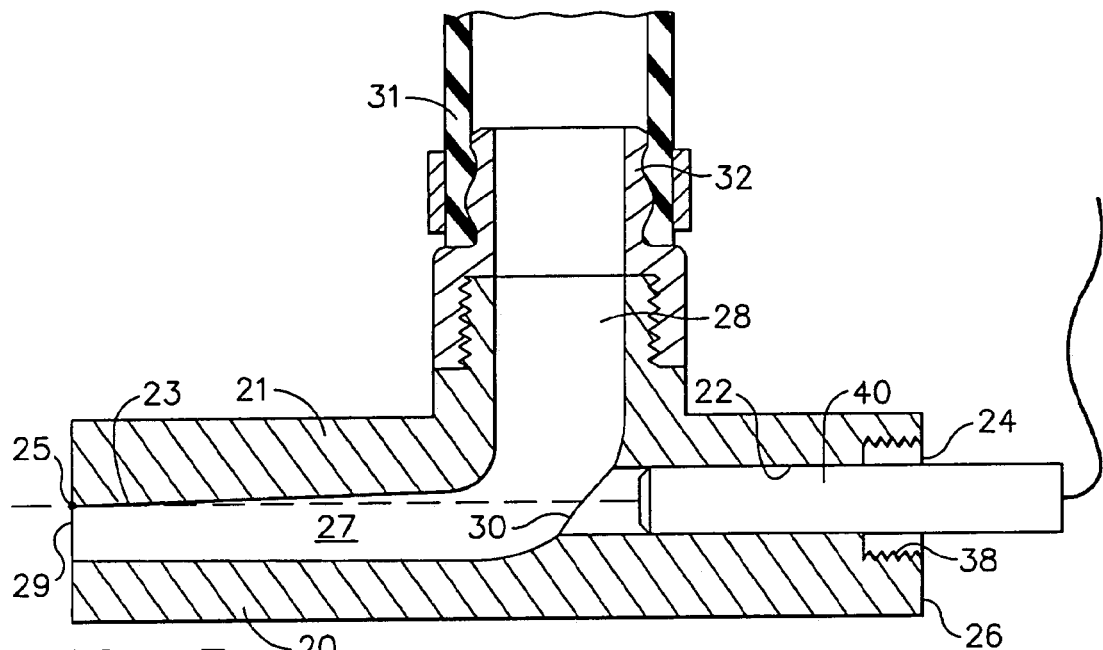
FIG. 3 shows a cross sectional view through the laser-targeted coolant nozzle of the present invention, having a visible laser positioned therein.

Integral with the filtration system (not shown) is a high pressure pump system (also not shown) that delivers coolant under pressure to the inlet 28 of nozzle 20. As shown in FIG. 3, the coolant is supplied to the inlet 28 via a high pressure hose 31 to an inlet port 32 secured to the inlet 28, at a pressure of up to 100 bar, typically 70 bar, at a flow rate of up to about 60 liters per minute.

The coolant nozzle emits a stream of coolant at a high velocity and pressure. During the grinding operation, the coolant stream impinges the grinding wheel at great velocity. The resulting collision of the high-velocity coolant stream with the high-speed rotating grinding wheel causes the impinging coolant fluid to splash and splatter in all directions, creating a cloud of coolant mist and droplets that obstructs nearly completely the visibility of the machining operation.

Nevertheless, precise targeting of the stream of coolant to the machining interface can be important to achieving effective and accurate grinding. If the coolant is not properly directed to all necessary portions of the grinding wheel, faulty grinding can result from over-heating of and excessive metal removal from the workpiece.

Since the high speeds of the operation prevent aiming or directing the coolant stream at the targeted portion of the grinding wheel, after the grinding operation has begun, the present invention was developed to accurately position the nozzle assembly, prior to starting the coolant stream and the grinding operation. FIG. 1 shows the metalworking assembly prior to the start of the grinding operation. To ensure that the nozzle 20 will direct the stream of coolant 18 (shown in FIG. 2) at the proper location on the grinding wheel 2, shown as machining interface 19, the nozzle 20 is configured with a laser bore 22 within which a visible light laser 40 can be positioned. The laser bore 22 is configured to accept and removably secure the laser 40 in a stationary position. In its stationary position, the visible laser 40 can emit a beam of visible light along a line 23.

The laser bore 22 is configured within the nozzle 20 for cooperative positioning of laser device 40 with the outlet 29. More specifically, the laser light beam emitted along line 23 cooperates with a stream reference point 25 on the periphery of the outlet 29, to provide a targeting means for visually positioning and directing the subsequent stream of coolant 18 from the nozzle 20 at the grinding wheel 2. Typically, the metalworking operation requires that the profile of the emitted stream 18 of coolant registers with the machining interface 19 on the periphery of the grinding wheel 2. To ensure proper orientation of the nozzle and registration of the profile of the coolant stream with the profile of the machining interface, the machining interface 19 will have a profile having at least one machining reference point 15. Typically, the machining reference point 15 and the stream reference point 25 are positioned upon the profiles of their respective machining interface 19 and nozzle outlet 18 in a cooperating and substantially similar location. The machining reference point 15 is selected whereby, when the visible light beam along line 23 emitted from the laser-targeted nozzle 20 is registered with or lies upon the machining reference point 15, the coolant nozzle 20 is properly targeted and oriented for the subsequent metalworking operation.

As shown in FIG. 1, the nozzle 20 having the laser 40 inserted into the laser bore 22, is positioned manually, whereby the visible laser beam along line 23 passes through or along both the stream reference point 25 to the machining reference point 15. In this position, the coolant nozzle has been properly and optimally pre-positioned for the subsequent metalworking operation. The pre-positioned and targeted coolant nozzle is then assured to emit properly and effectively the stream 18 of cooling fluid at the machining interface 19 during the grinding operation.

The coolant nozzle 20 is positioned proximate to the periphery of wheel 2 to deliver the high pressure stream 18 of coolant at the wheel in a substantially radial direction to the wheel circumference at a point in advance of the machining interface 19. Typically, a support stand (not shown) is provided upon which the coolant nozzle is secured. The support stand is configured to provide up-down, forward-backward, left-right movement and pivoting of the coolant nozzle, for optimum coolant performance. The nozzle is typically configured for independent movement relative to the workpiece and grinding wheel. Preferably, the nozzle assembly can be moved or rotated in all directions, and can be oriented or positioned to discharge the coolant stream at the grinding wheel without interference from the workpiece.

In the embodiment illustrated in FIG. 2, the nozzle flow passage directs a stream 18 of coolant in the shape of a sheet or fan at the periphery of the wheel to obtain substantially even distribution of coolant upon the machining interface 19 of the wheel. The nozzle can alternatively be configured to provide an emitted coolant stream having a cross-sectional profile of a variety of shapes. In a typical operation, the coolant stream profile and size is configured to match the profile and size of the machining interface of the metal working tool, such that coolant fluid is constantly supplied to that portion of the metalworking tool, such as the grinding wheel, that is removing the metal from the workpiece. Typical nozzle stream profiles can be linear, rectilinear, circular, oval, or curvilinear.

The nozzle 20 is configured and arranged to direct the stream 18 of coolant fluid to the periphery of the wheel at the impact point across the full width of the wheel. In some operations, it is preferred to direct the coolant fluid in a direction substantially perpendicular to the periphery of the wheel.

Figure 5:
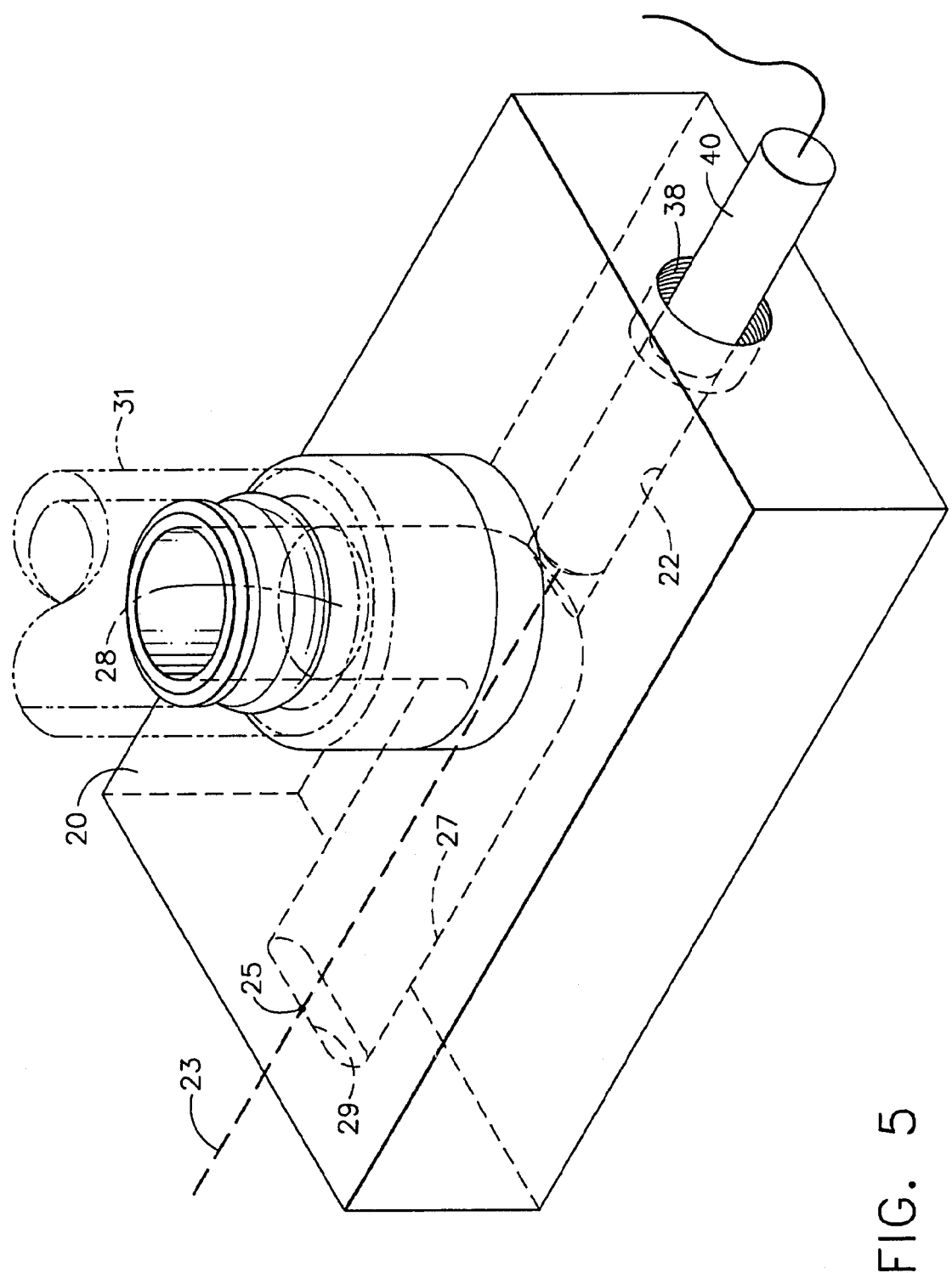
FIG. 5 shows a schematic diagram of an alternative laser-targeted coolant nozzle of the invention with the visible light laser positioned therein.
Figure 6:
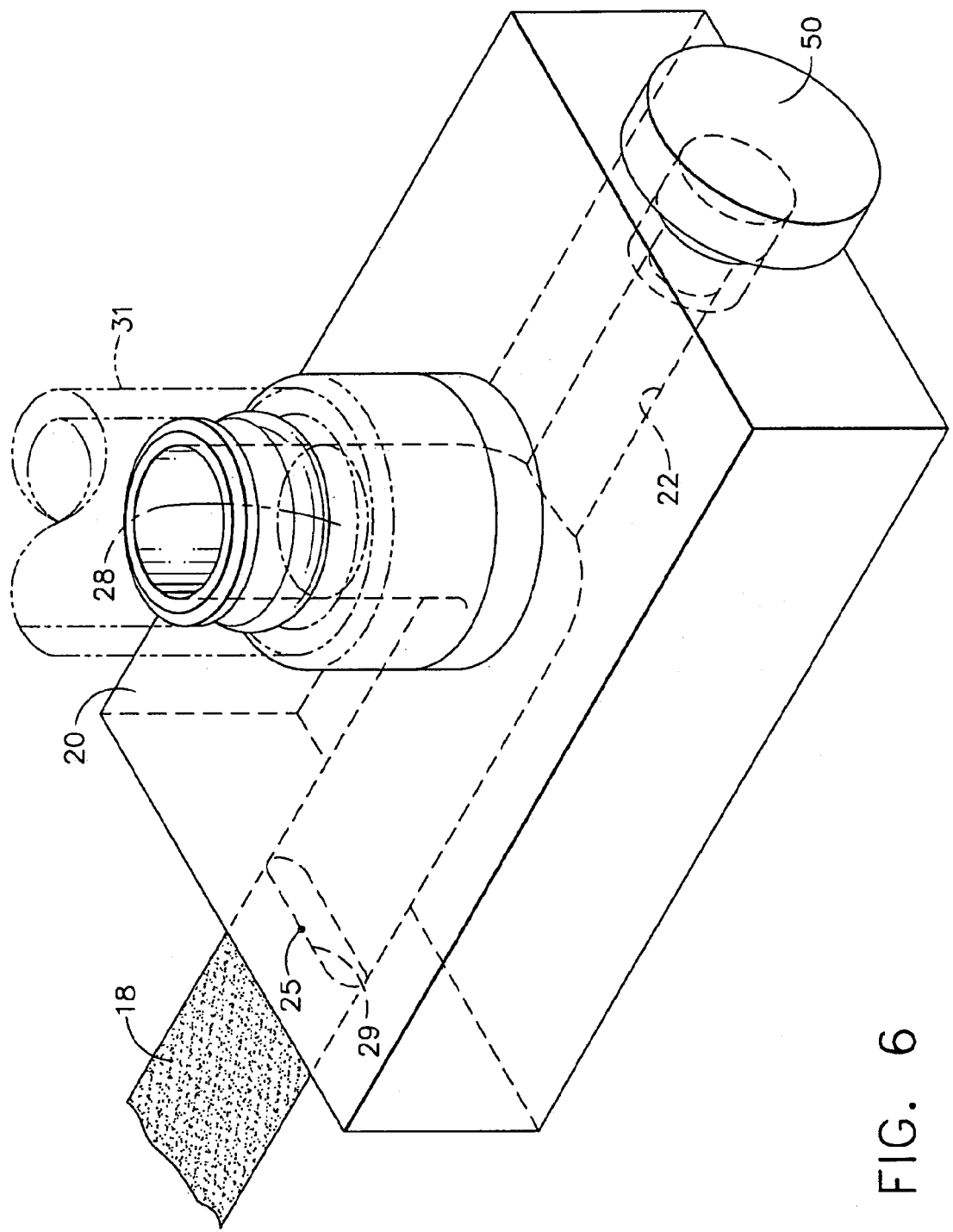
FIG. 6 shows the schematic diagram of FIG. 5, showing the coolant nozzle emitting a stream of coolant fluid.

While the coolant nozzle 20 shown in FIG. 1 is configured to emit a coolant stream that fans or expands outwardly from the outlet of the nozzle, the nozzle can also be configured to restrict the profile of the emitted coolant stream 18 to a constant cross-sectional size and shape, as shown in FIG. 6. The embodiment is shown in FIG. 5 with the visible laser 40 positioned within the laser bore 22 of the nozzle, for proper targeting and positioning of the nozzle 20, as described herein above. The nozzle 20 has an outlet 29 profile that is approximately rectangular having a width and a height. The flow passage 27 leading to the outlet 29 is configured with parallel sidewalls and a constant cross-sectional profile, which provides an emitted coolant stream 18 having a profile with the same width and height.

A typical laser-targeted coolant nozzle is shown in cross-section in FIG. 3. The coolant nozzle 20 comprises a nozzle body having an inlet 28, outlet 29, and a flow passage 27 connecting the inlet with the outlet. The geometry of the inlet 28, the inner surface of the fluid passage 27, and the outlet 29 are configured to provide the profiled pattern of the emitted coolant stream 18 (shown in FIG. 2). Design criteria can include configuring the interior surface of the fluid passage to limit turbulence of the fluid as it passes through the nozzle, thereby causing the flowing coolant to conform to a particular coolant stream profile. In one embodiment, the nozzle is configured to pass the coolant liquid there through in laminar flow as the coolant passes through and exits the nozzle.

The coolant nozzle 20 has a body 21 having a laser bore 22 that forms an opening 24 through an outer surface 26 of the nozzle body, which is in fluid communication with the flow passage 27. The laser bore 22 is typically tapered toward and intersects at an interface 30 with the coolant flow passage 27 of the nozzle 20. The laser bore 22 is configured to receive a laser device 40, as shown in FIGS. 1 and 3.

Figure 4:
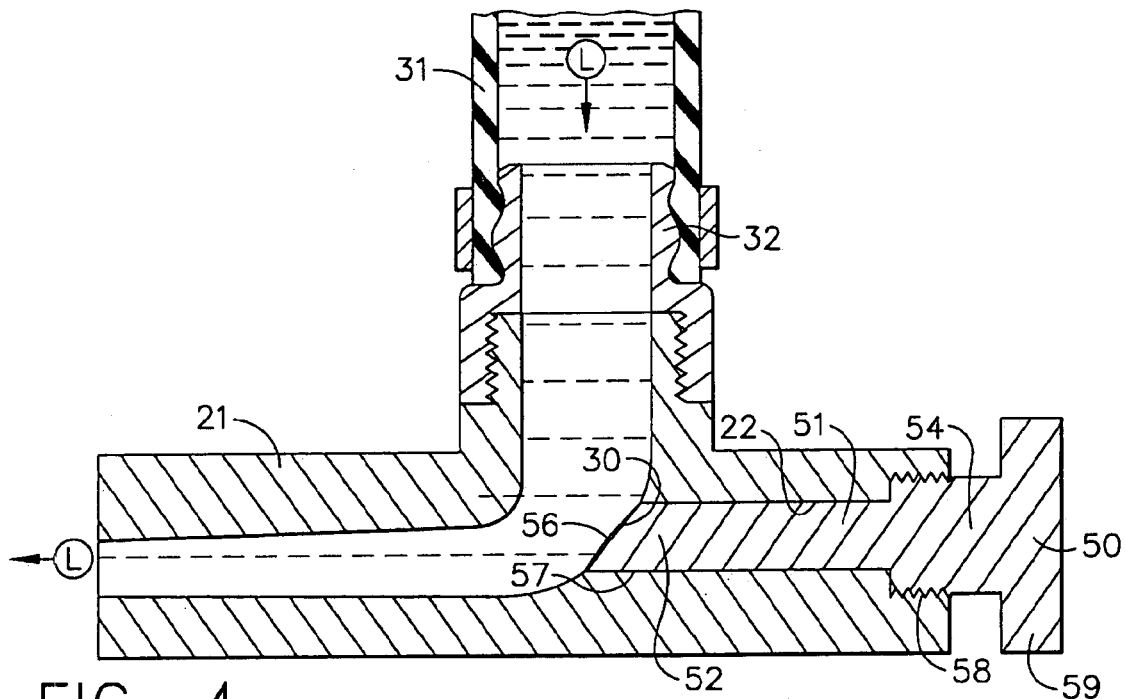
FIG. 4 shows the cross sectional view of the coolant nozzle of FIG. 2, where the visible laser has been removed and replaced with a seal plug.

Typically the nozzle 20 is configured for removal of the laser 40 from the laser bore 22, and for insertion of a removable plug 50 into the laser bore 22 during the grinding operations, as shown in FIGS. 2, 4 and 6. Typically the removable plug 50 will have a distal end 52 that projects through the laser bore 22. The distal end 52 of the removable plug 50 typically has a plug face surface 56 that cooperates with the inner surface of the flow passage 27 of the nozzle 20 along an interface 30 between the flow passage 27 and the laser bore 22. The plug face surface 56 mimics the shape of the inner surface of the flow passage 27 that had been removed when the laser bore 22 was formed in the nozzle body 21.

The laser bore 22 is configured to provide at least one line of sight from the laser bore 22 to the flow passage outlet 29. Typically the laser bore 22 and the laser device 40 are of a cylindrical shape, although other shapes can be used. Likewise, the plug 50 has a body portion 51 of substantially the same shape as the laser, and is configured to conform to a seal (not shown) disposed in the laser bore 22. The plug 50 will typically have a means of engaging the inner surface of the laser bore 22, such as a set of threads 58 that mate with corresponding threads 38 in the laser bore 22. For ease of removal, the plug 50 will typically have a handle 59 on a proximal end 54 that extends from the nozzle body for easy insertion and removal of the plug.

A typical coolant nozzle of the present invention is available from Innatech, LLC of Rochester, Mich.

The laser device 40 can be any laser which emits a visible laser beam. The color and size of the emitted laser beam can be any kind which is visible from a distance of less than about 2 meters. Typically the laser is a red diode laser for emitting a visible red laser beam. The laser can be self-powered, such as with batteries and a manual on-off switch, or can be powered and controlled through a power cord to a remote electrical power source.

A typical example of a visible laser is the MLM (¾ inch diameter), available from FP Industries, Cabano, Quebec, Canada.

The present invention also includes a method of using a visible laser to align a coolant stream emitted from a nozzle toward the machining interface of a metal cutting tool when performing a working operation on a work piece. In a typical method, a work piece is secured in a holder on the table of a metal grinding apparatus. The work piece and a rotating grinding tool are configured for engagement at a machining interface to remove metal from the work piece. The machining interface has a specific interface profile that conforms to the profile of the outer periphery of the grinding wheel, and will form the machine profile on the work piece when completed. The positioning movement of the work piece and the grinding tool relevant to one another is typically controlled by a computerized controller. A nozzle for directing a stream of cooling fluid is mounted to provide the stream of cooling fluid at the machining interface during the metalworking operation. The nozzle is configured to provide a laser bore into which a visual laser can be inserted for purposes of positioning the nozzle. The operator will insert the visible laser prior to operation, the visible laser will cooperate with the nozzle whereby the directing and positioning of the laser beam emitted from the laser will indicate the destination of the resulted coolant stream that is discharged from the flow nozzle during operation. The laser beam is configured to accurately reproduce the orientation of the coolant stream that will be emitted from the positioned coolant nozzle. After the nozzle is properly oriented and positioned, and secured in place, the operator removes the laser device from the laser bore, and inserts the plug that seals the laser bore during the grinding operation, preventing coolant fluid from leaking out of the coolant nozzle during operation. At any time the operator can recheck the positioning and orientation of the nozzle by removing the plug and reinserting the laser.

The method includes aligning the laser beam along a line which passes through the stream reference point and the machining reference point as described herein above. This permits the flow nozzle to be positioned and oriented such that the profile of the coolant stream matches or is registered with the profile of the machining interface.

In an alternative embodiment the nozzle can provide a separate laser bore that does not interface or communicate with the fluid passage of the nozzle. In this embodiment the laser bore will penetrate a rear portion of the nozzle and pass complete through a front portion of the nozzle, typically immediately adjacent the outlet opening in the nozzle. The emitted visual beam from the laser inserted into the laser bore passes through the outlet opening of the laser bore and is directed towards the metalworking machine. The angle of the laser beam emitted can be parallel with the angle of the stream of coolant fluid emitted from the nozzle.

In the above embodiment, the discharge or the outlet opening of the laser orifice can be covered with a clear glass material which permits the laser beam to pass there through, but which prevents coolant fluid from splashing back into the opening of the laser bore.

The present invention is carried into practice using a multi-axis milling machine adapted to operate using a grinding wheel in place of the normal milling cutter. A main reason for using a multi-axis machine of this kind is its ability to reproduce complex surface profiles on the ground workpiece, although this particular topic is outside the scope of the present invention. It is to be understood, therefore, that the relative motions of the grinding wheel and workpiece can be compound movements, notwithstanding that for simplicity the accompanying drawing represents such relative movement as rectilinear.

The invention claimed is:

1. A method for machining to remove metal from a workpiece, comprising the steps of:
   1) providing a holder for a workpiece,
   2) providing a metalworking tool having a machining interface configured to engage the workpiece along the machining interface to remove metal from the workpiece,
   3) cooling the metalworking interface by emitting a stream of a cooling liquid through a nozzle body having a flow passage with an inlet and an outlet, and a bore having an access opening in fluid communication with the flow passage and a line of sight with the flow passage outlet, wherein the access opening is sealed by a removable plug, wherein prior to the machining, the plug is removed from the bore and a visible laser is inserted into the bore for emitting a laser beam that cooperates with the nozzle body for visually positioning the nozzle relative to the metalworking tool, whereby the emitted stream of cooling liquid is directed at the machining interface.

2. The method according to claim 1 wherein the provided metalworking tool has an atypical interface profile, and the emitted stream of cooling liquid has an atypical cross-sectional profile substantially the same as the atypical interface profile, and wherein the atypical profile is a shape other than a linear, rectilinear, circular, oval, and curvilinear profile.

3. The method according to claim 1 wherein the visually positioning of the nozzle comprises aligning the visible laser beam along a line passing through a stream reference point along the flow passage outlet and a machining reference point on the machining interface.

4. The method according to claim 1 wherein the flow passage that leads to the outlet is configured with parallel sidewalls and a constant cross-sectional profile, for emitting a stream of a cooling liquid having a profile with the same width and height.

5. A method for aligning a cooling nozzle for supplying coolant to a machining interface of a metalworking tool during the machining of a workpiece, comprising the steps of:
   1) providing a holder for a workpiece and a workpiece,
   2) providing a metalworking tool having a machining interface configured to engage the workpiece along the machining interface to remove metal from the workpiece,
   3) providing a coolant nozzle comprising a nozzle body having a flow passage with an inlet and an outlet, and a laser bore in fluid communication with the flow passage and a line of sight with the flow passage outlet,
   4) inserting a visible laser into the bore in a stationary position for emitting a laser beam that cooperates with the outlet on the nozzle body for visually positioning the nozzle relative to the metalworking tool,
   5) manually positioning the nozzle so that the visible laser beam passes to a machining reference point on the machining interface of the metalworking tool,
   6) securing the nozzle in position, and
   7) removing the visible laser and inserting and securing a removable plug to seal the laser bore,
   whereby the coolant nozzle is properly targeted to emit the coolant stream at the machining interface.

6. The method according to claim 5 wherein the, emitted visible laser beam passes through a stream reference point on the periphery of the outlet of the nozzle.

* * * * *